United States Patent
Rausch et al.

(10) Patent No.: US 9,105,303 B2
(45) Date of Patent: Aug. 11, 2015

(54) VARIABLE BIT ASPECT RATIOS IN MAGNETIC MEDIA

(71) Applicant: Seagate Technology LLC, Cupertino, CA (US)

(72) Inventors: Tim Rausch, Farmington, MN (US); Edward Charles Gage, Lakeville, MN (US)

(73) Assignee: SEAGATE TECHNOLOGY LLC, Cupertino, CA (US)

( * ) Notice: Subject to any disclaimer, the term of this patent is extended or adjusted under 35 U.S.C. 154(b) by 0 days.

(21) Appl. No.: 14/492,844

(22) Filed: Sep. 22, 2014

(65) Prior Publication Data

US 2015/0009787 A1    Jan. 8, 2015

Related U.S. Application Data

(63) Continuation of application No. 13/921,676, filed on Jun. 19, 2013, now Pat. No. 8,842,503.

(51) Int. Cl.
| G11B 11/00 | (2006.01) |
| G11B 20/12 | (2006.01) |
| G11B 5/012 | (2006.01) |
| G11B 5/09 | (2006.01) |
| G11B 5/00 | (2006.01) |

(52) U.S. Cl.
CPC ............ *G11B 20/1217* (2013.01); *G11B 5/012* (2013.01); *G11B 5/09* (2013.01); *G11B 2005/0021* (2013.01)

(58) Field of Classification Search
None
See application file for complete search history.

(56) References Cited

U.S. PATENT DOCUMENTS

| 2012/0281310 A1 | 11/2012 | Lim et al. |
| 2013/0335856 A1 | 12/2013 | Tanabe et al. |

OTHER PUBLICATIONS

Plumer et al., "New Paradigms in Magnetic Recording", La Physique Au Canada, vol. 67, No. 1, 2011, pp. 25-29.

*Primary Examiner* — Brenda Bernardi

(74) *Attorney, Agent, or Firm* — Hollingsworth Davis, LLC

(57) ABSTRACT

An apparatus comprises a write transducer, an energy source, and a controller. The write transducer is configured to write data to a magnetic recording medium, and the energy source is configured to heat the magnetic recording medium while it is being written to by the write transducer. The controller is coupled to the write transducer and configured to adjust at least an operating power of the energy source to selectably cause bits having variable bit aspect ratios to be written to the magnetic media.

20 Claims, 4 Drawing Sheets

VARIABLE BIT ASPECT RATIOS IN MAGNETIC MEDIA

CROSS REFERENCE TO RELATED CASES

This is a continuation of U.S. patent application Ser. No. 13/921,676, filed Jun. 19, 2013, which is hereby incorporated by reference in its entirety.

SUMMARY

Embodiments of the disclosure are directed to approaches for varying the bit aspect ratios in magnetic recording media. Some embodiments involve a write transducer, an energy source, and a controller in a magnetic recording head. The write transducer is configured to write data to a magnetic recording medium, and the energy source is configured to heat the magnetic recording medium while it is being written to by the write transducer (e.g., during heat assisted magnetic recording, "HAMR"). The controller is coupled to the write transducer and configured to adjust at least an operating power of the energy source to selectably cause bits having variable bit aspect ratios to be written to the magnetic recording medium.

Some embodiments involve a method of providing varying bit aspect ratios on a magnetic recording medium. The method can vary depending on whether the bit aspect ratio is pre-determined. For example, a method can include receiving a request, where the request may be a read or a write request associated with a zone of a recording medium. The zone associated with the read or write request is determined, and a target bit aspect ratio associated with that zone is also determined. Then the read or write request is fulfilled by executing the read or write request using the target bit aspect ratio of the associated zone.

Other embodiments involve providing varying bit aspect ratios on a magnetic recording medium where the bit aspect ratio may not be pre-determined. The method includes selecting a bit aspect ratio from a range of bit aspect ratios. Then the operating power of an energy source of a magnetic recording head is adjusted to cause bits having the selected bit aspect ratio to be written to the magnetic medium.

These and other features and aspects of various embodiments may be understood in view of the following detailed discussion and accompanying drawings.

DETAILED DESCRIPTION

Magnetic data storage systems commonly include one or more magnetic recording heads that write and read information to and from a recording medium. Data is stored on recording media for various reasons. For example, large amounts of data may be stored with little, or infrequent, access to such data being expected. Alternatively, data may be stored with frequent, reliable, and speedy access being expected. These expectations are satisfied by the amount of data stored on a single recording medium. For example, large capacity recording media tend to have smaller bit aspect ratios to accommodate the increased number of storage bits on the media. Higher performance media typically have larger bit aspect ratios to accommodate access requirements. Embodiments of the present disclosure can satisfy both of these information storage preferences on a single magnetic recording medium by varying the bit aspect ratios on the magnetic recording medium.

An example data storage system, a hard disk drive, includes a magnetic recording head arrangement. The magnetic recording head arrangement is located on a slider positioned proximate a rotating magnetic medium. The magnetic medium is configurable for reading and/or writing data with the magnetic recording head arrangement. The surface of the magnetic recording head arrangement facing the magnetic medium includes a head media interface (HMI), which is also referred to as an air bearing surface (ABS).

Proximate the HMI, the magnetic recording head arrangement includes one or more magnetic read heads protected by one or more shields for reading data from the magnetic medium. Also proximate the HMI, the magnetic recording head arrangement includes a write transducer having one or more magnetic write heads for writing data to the magnetic medium. The magnetic write head(s) include a write coil, a main write pole, and a write return pole.

A write heater assembly can also be positioned near one of the write poles or between the write poles. A read heater assembly can be positioned near the one or more magnetic read heads.

Figure 1:
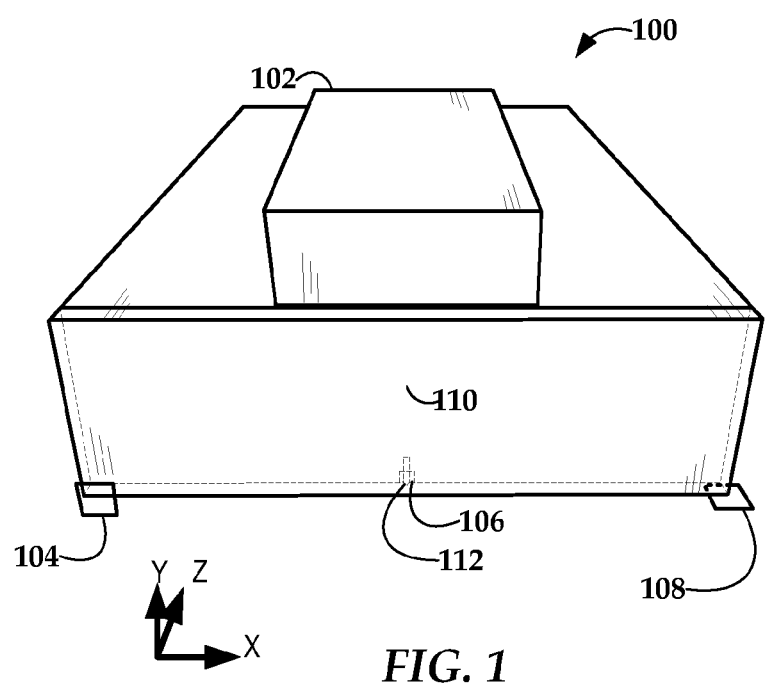
FIG. 1 is a perspective view of a laser arrangement, in accordance with various embodiments.

In some embodiments, the magnetic recording head arrangement is configured for heat assisted magnetic recording (HAMR) by including a laser arrangement 100 shown in FIG. 1. The laser arrangement 100 includes an energy source 102 (e.g., laser diode) configured to produce laser light that energizes an optical antenna 112 of a near field transducer (NFT). The laser light produced by the laser diode is guided to the NFT through an optical waveguide 110 and is focused on the optical antenna 112 by a parabolic mirror 106 or other focusing device such as a tapered optical waveguide. The laser arrangement 100 is also proximate the HMI, which is shown as plane 108 in FIG. 1, and the main write pole (not shown in FIG. 1). The energy source 102 can be mounted external, or integral, to the magnetic recording head arrangement.

The slider, including laser arrangement 100, moves across the magnetic recording medium in the x-axis of FIG. 1, also referred to as the cross-track direction. Relative to the slider, the magnetic recording medium rotates in the orthogonal z-axis direction, referred to as the down-track direction. The edge of the slider that first passes over any position of the rotating recording medium in the down-track direction is referred to as the leading edge, and the edge of the slider that is last to pass over the position of the recording medium is referred to as the trailing edge, designated by plane 104. The magnetic recording head arrangement, with laser arrangement 100, reads and/or writes bits to the rotating magnetic recording medium as the magnetic recording medium rotates relative to the slider.

Figure 2:
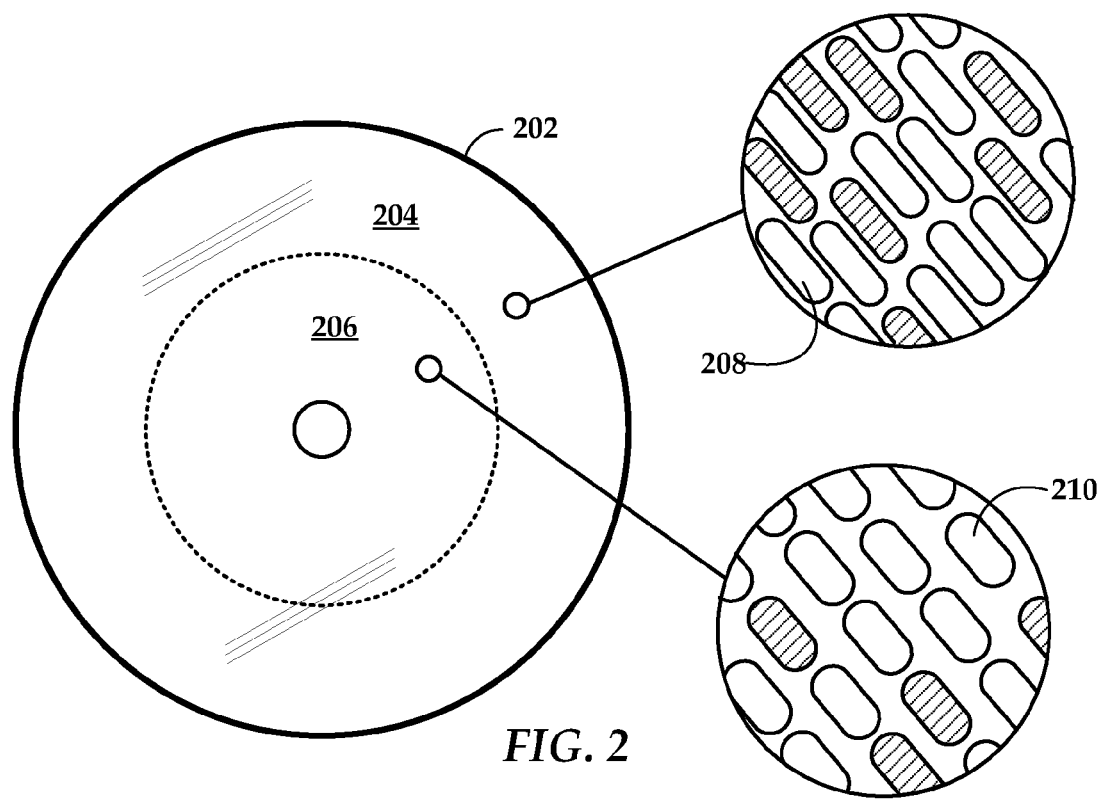
FIG. 2 illustrates a magnetic recording medium with a plurality of zones, in accordance with various embodiments.

FIG. 2 illustrates an example magnetic recording medium 202 for reading or writing bits of varying bit aspect ratios. In this example, the bits having varying bit aspect ratios are segregated into different zones on the recording medium 202. A first zone defines a portion of the magnetic recording medium 202 nearest the circumference, or outer edge, of the medium 202. A second zone 206 defines the portion of the magnetic recording medium 202 closest to the center of the medium 202. While two zones 204, 206 are illustrated, magnetic recording medium 202 could include any number of zones. Also, although the illustrated zones 204, 206 contain entire track lengths (circular zones), a zone could be defined by a portion of a track (wedge shaped zones).

The different zones 204, 206 include bits of differing bit aspect ratios. Bit aspect ratio (BAR) is the ratio of the down-track dimension of a bit with respect to the cross-track dimension of a bit. For example, inset 208 illustrates that the bits of zone 204 are longer and narrower than the bits of zone 206 shown in inset 210. The bits of zone 204 have a greater down-track dimension and a smaller cross-track dimension when compared with the bits of zone 206. Thus, the bits of zone 204 have a higher bit aspect ratio than the bits of zone 206.

In some embodiments, some zones of a magnetic recording medium can have a different target bit aspect ratio than other zones. This variable bit aspect ratio capability can be used to designate different zones on the medium for different purposes. Certain zones can be designated for performance while other zones can be designated for capacity. This differentiation of portions of a magnetic recording medium can be used to provide optimal functionality of a single medium, for example, when part of the disk drive is needed for performance and another part for capacity.

Figure 3:
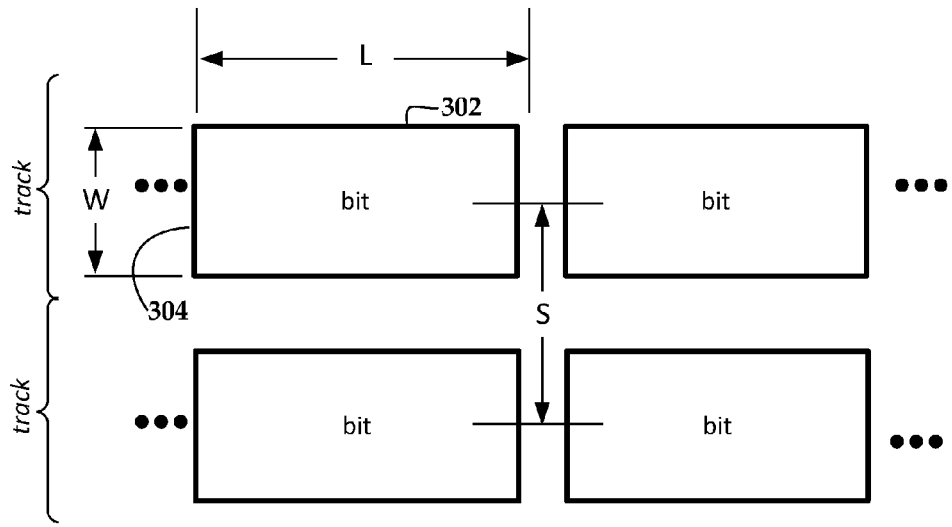
FIG. 3 illustrates a plurality of bits on a magnetic recording medium, in accordance with various embodiments.

Bit aspect ratio is further illustrated in FIG. 3. Four bits are shown in two adjacent tracks. As set forth above, bit aspect ratio is defined as a bit's length 302 (down-track dimension, L) divided by the bit's width 304 (cross-track dimension, W). Track spacing (S) is defined by measuring the cross-track distance between the center points of the widths of adjacent bits. The bits of the two illustrated tracks have the same bit aspect ratios. As described in discussion above, these tracks may be located in the same zone. If the adjacent tracks were located in different zones, the bits may have different bit aspect ratios. The writing of bits with varying bit aspect ratios is further discussed below.

Figure 4:
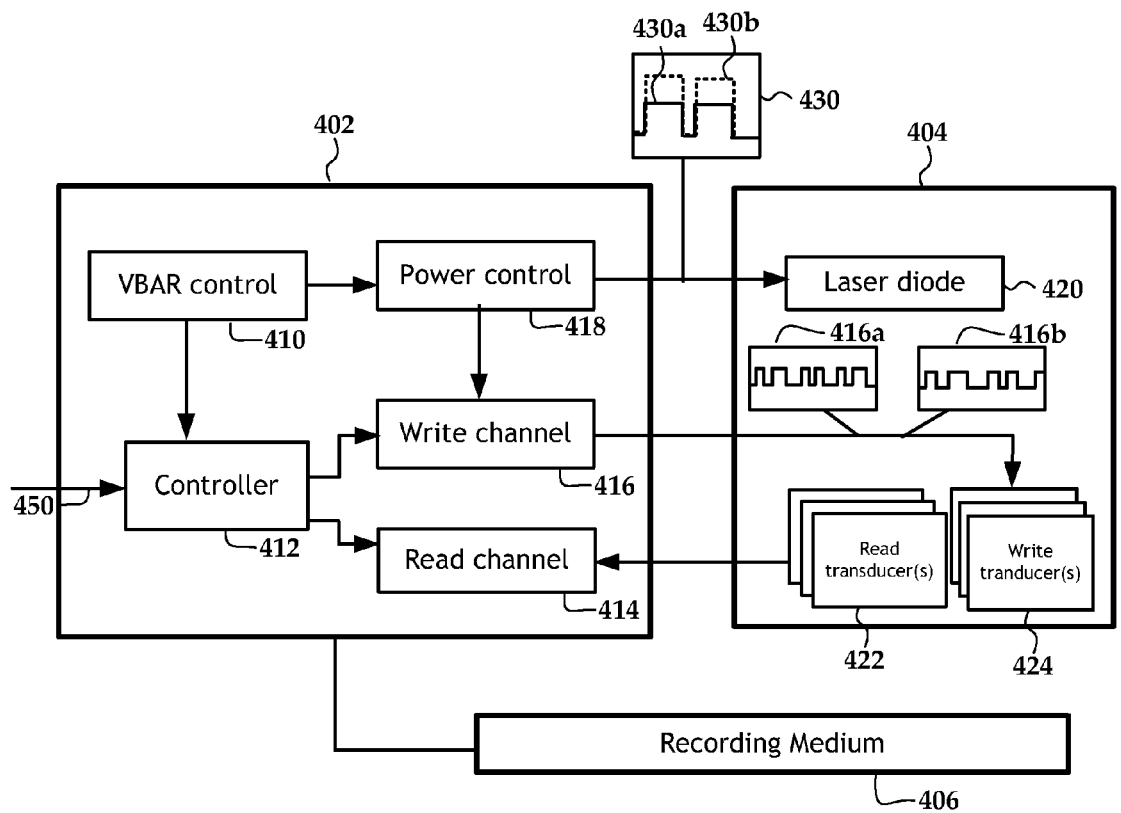
FIG. 4 is a block diagram of a magnetic recording system, in accordance with various embodiments.

FIG. 4 illustrates a magnetic recording system. The system includes a hard disk drive controller 402, a slider 404, and a magnetic recording medium 406. The hard disk drive controller 402 includes control circuitry configured to implement multiple functions of the magnetic recording system. Digital data is received by the read/write (R/W) controller 412, e.g., from a host processor (not shown in FIG. 4) along line 450. A variable bit aspect ratio (VBAR) controller 410 provides bit aspect ratio information to the read/write (R/W) controller 412. For read operations, the bit aspect ratio information provided by the VBAR controller 410 includes the length and/or width of the bits that are being read. The R/W controller 412 modifies the operation of the read channel 414 to accommodate bits having a particular bit aspect ratio according to the bit aspect ratio information. Modifying the read channel operation can include shortening or lengthening the read time depending on the length of the bits being read. Modifying the read channel operation can include selecting one or more read heads used for the read operation depending on the width of the bits being read.

For write operations, the R/W controller 412 uses bit aspect ratio information provided by the VBAR controller 410 to control or modify operation of the write channel 416. Modifying operation of the write channel may include shortening or lengthening a period of time that the write transducer is activated depending on the length of the bits being written. The VBAR controller 410 may also provide information to the power control circuitry 418 used to energize the laser diode 420. Wider bits may require more energy to the laser diode when compared to the energy requirement of narrower bits, for example.

The slider 404 includes one or more read transducers 422, one or more write transducers 424, and an energy source (e.g., laser diode 420). The energy source is configured to heat the magnetic recording medium 406 while it is being written to by a write transducer 424.

When writing to the magnetic recording medium 406, the variable bit aspect ratio controller 410 informs the R/W controller 412 and power controller 418 of the target bit aspect ratio. R/W controller 412, through write channel 416, is coupled to the write transducer 424 and selects one or more write transducers 424 to perform the writing. The R/W controller 412 is configured to adjust at least an operating power of the energy source 420 to selectably cause bits having variable bit aspect ratios to be written to the magnetic media 406. Depending on the target bit aspect ratio, the write channel 416 is adjusted.

For example, to control the cross-track dimension of the target bit aspect ratio, power controller 418 adjusts the power supplied to laser diode 420. Wider bits (bits with a larger cross-track dimension) are written by increasing the power of the laser diode 420. Conversely, narrower bits (bits with a smaller cross-track dimension) are written by decreasing the power of laser diode 420. Box 430 illustrates two laser diode power signals. A lower power signal 430a (solid line) has a lower amplitude current or voltage when compared to a higher power signal 430b (dashed line) which has a higher amplitude current or voltage. In some embodiments, the laser power is selected to provide optimal bit widths across a range of products allowing one writer design per platform.

Alternatively, or in addition to adjusting the cross-track dimension, the down-track dimension of the written bits is controlled by the one or more write transducers 424. For longer bits, the magnetic field is applied longer whereas bits of shorter down-track dimension are written with the magnetic field applied for less time. Inset box 416a shows the write channel signal corresponding to writing shorter bits. Inset box 416b shows the write channel signal corresponding to writing longer bits. To control writing of both bit dimensions, variable bit aspect ratio controller 410 determines and/or indicates not only the target bit aspect ratio, but also the target cross-track dimension (e.g., to the power control 418) and down-track dimensions (e.g., to the write channel 416 via the R/W controller 412).

The properties of HAMR variable bit aspect ratio allow the same head design, and/or a wafer design (which includes a number of the heads), to be used, fulfilling a wide range of product writer requirements with a single (or a few) designs.

When reading bits of variable bit aspect ratios, the variable bit aspect ratio controller 410 informs the read channel 414 via the R/W controller 412 of the cross-track dimensions of the bits to be read. The R/W controller 412 operates to modify the read channel so that signals from the one or more appropriate read transducers 422, the one or more read transducers corresponding to, or accommodating, the cross-track dimension of the bits to be read, is used to perform the reading. Configurations of the plurality of read and write transducers are further illustrated in FIG. 5.

Figure 5:
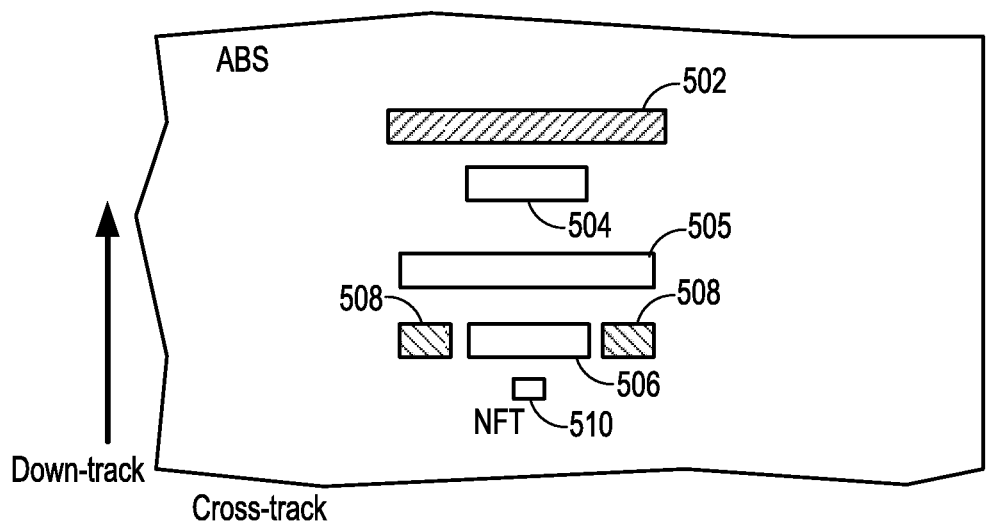
FIG. 5 is a cross-sectional view of a magnetic recording head, in accordance with various embodiments.

FIG. 5 illustrates a cross-section of a slider at the ABS. Areal density can be optimal for a reader to track width ratio of about 0.9. Thus, it can be beneficial to have multiple read transducers to address a range of bit widths. The slider includes a plurality of read transducers 502, 504, including a larger read transducer 502 (having a larger cross track dimension) and a smaller read transducer 504 (having a smaller cross track dimension). The multiple read transducers 502, 504 are located between reader shields (not shown), optionally sharing a common shield, in tandem to each other in a down-track direction. Some embodiments may include, read transducers are located side-by-side in a cross-track direction. In these embodiments, signals from one read transducers or multiple read transducers may be used to read the bits. In embodiments that use read transducers that are side-by-side read in the cross-track direction, the read transducers may use one or more common shields.

The read transducers 502, 504 are not required to be located adjacent each other; however, placing them in close proximity facilitates an efficient manufacturing of the slider. For example, placing a plurality of read transducers in the same gap between the reader shields adds minimal cost for additional read transducers. In some configurations, the studs, e.g., vertical electrical connections, for each of the read transducers can be carried up through the wafer and at a late mask step, the decision can be made as to which read transducer(s) would be used. Then the appropriate electrical connection(s) are provided at the top surface of the wafer. Also, if read transducers have a low yield, multiple read transducers can be connected through the electrical connections between the slider and the controller such that the best reader can be utilized. These approaches allow a single design and wafer implementation that can be applied for various products further reduces costs and complexity in manufacturing and design.

The different sizes of the read transducers 502, 504 correspond to the different cross-track dimensions of the varying bit aspect ratios. For example, the cross-track dimension of large read transducer 502 corresponds to the largest/widest bit aspect ratio cross-track dimension of the magnetic recording medium. Similarly, the cross-track dimension of small read transducer 504 corresponds to the smallest/narrowest bit aspect ratio cross-track dimension of the magnetic recording medium. Thus, read transducers 502, 504 can be configured to read different ones of the variable bit aspect ratios such that the appropriate read transducer 502 or 504 would be selected for a read request by choosing the correct read-write offset. While two read transducers are shown, any number of read transducers (three or more) can be included on the slider.

Alternatively, the slider can include a single read transducer having a cross-track dimension corresponding to the largest/widest cross-track dimension of the variable bit aspect ratios of a recording medium. In this configuration, bits having a narrower cross-track dimension than the cross-track dimension of the read transducer can be read using multi-level decoding of adjacent tracks. In multi-level decoding, two or more tracks are read concurrently such that the coherent tracks are processed as a single signal, e.g., a sum of each of the track's voltages. Since different data patterns in the concurrently read tracks can result in the same sum, the ambiguity is resolved by mapping algorithms in the write process and corresponding inverse mapping algorithms in the read process.

In configuration disclosed herein, bits having a narrower cross-track dimension than the cross-track dimension of the read transducer can also be read using two-dimensional decoding. Because at least a portion of an adjacent track is read concurrently with the intended track, track mis-registration causes interference in the read head. Thus, in two-dimensional decoding, interference from the one or more adjacent tracks is iteratively canceled to process the two or more detected signals.

The slider also includes a write transducer. The write transducer includes a near field transducer 510 (NFT), a small write pole portion transducer 506, two large write pole portion transducers 508, and a return pole 505. As discussed above, the varying bit aspect ratios can be selectably written by adjusting the operating power of an energy source, e.g., the laser diode that is used to energize NFT 510. The cross-track dimensions of the written bits are varied by generating a variable cross-track dimensioned hotspot in connection with a single, wide write pole (e.g., small write pole portion transducer 506, or a single write pole with a cross-track dimension corresponding to the sum of portions 506 and one or both of 508). The cross-track dimension of the hotspot can be varied, for example, by adjusting the laser operating power, using a different light path or NFT, using a micro-electrical-mechanical (MEMS) focuser, using a different wavelength of light, and/or using a different laser. Thus, a single write pole can be used with more than one NFT, or a single NFT could have an adjustable beam size. In further embodiments, a single write pole could be used to write bits with increased cross-track dimensions by writing a bit portion on a first revolution, then writing a second portion of the bit with a pre-determined offset on a second revolution. In these embodiments, the laser power used for the first and second portions of the bit could be the same.

Varying cross-track dimensions can also be achieved using a plurality of write elements. For example, two write poles of different cross-track dimensions, located down-track from each other, could be used to write a bit having a cross-track dimension corresponding to the sum of the two write pole cross-track dimensions. Also, the small write pole portion transducer 506 can be used with optional extensions, one or more large write pole portion transducers 508, to selectably increase the cross-track dimension of a written bit. While the slider of FIG. 5 is illustrated with a plurality of both read transducers and write transducers, embodiments of this disclosure can include one or more read transducers in combination with one or more write transducers.

Figure 6:
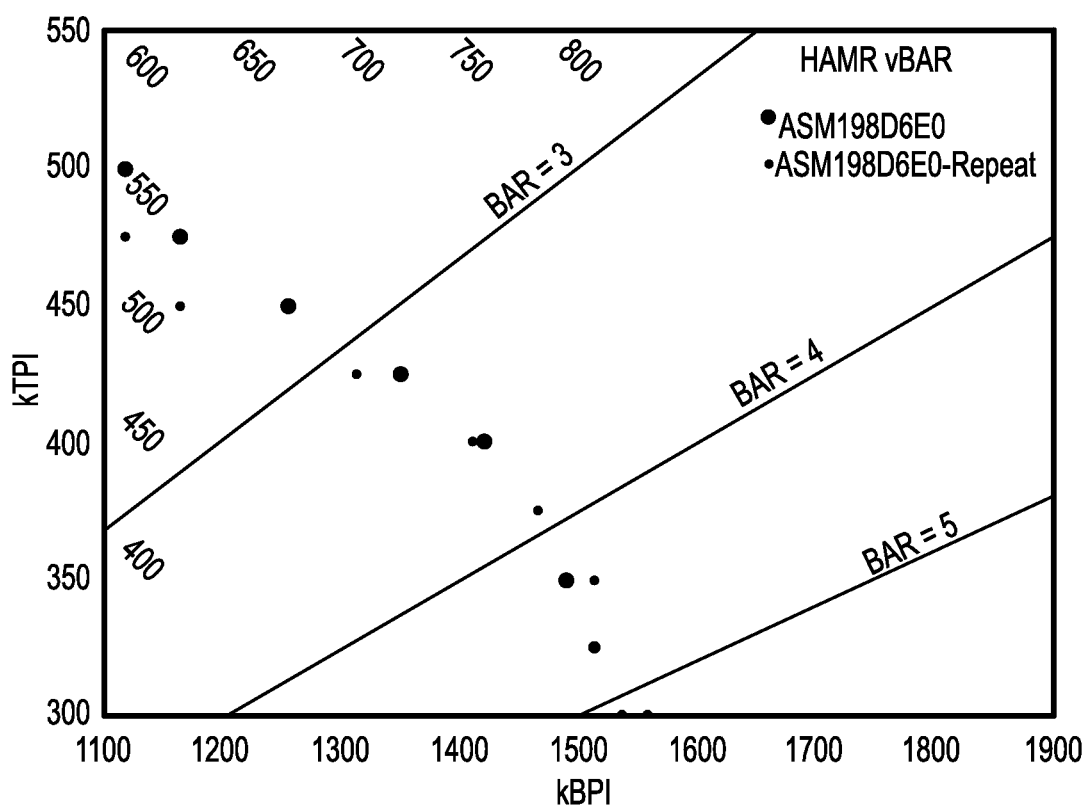
FIG. 6 is a graph of variable bit aspect ratio capabilities, in accordance with various embodiments.

Variable bit aspect ratio (vBAR) capabilities of the HAMR recording process are shown in FIG. 6. The graph illustrates the bit aspect ratios with (kilo) bits per inch along the x-axis and (kilo) tracks per inch along the y-axis. As the bit aspect ratio, and bits per inch, decrease, the tracks per inch increase. The bit aspect ratios of FIG. 6 include ratios obtained over two days of testing the same magnetic recording head. As discussed above, the varying bit aspect ratios are achieved by adjusting the laser power. By adjusting the laser power and retuning the channel, the bit aspect ratio can be adjusted from a value of about 5.1 to about 2.5. This range of tunability can be further adjustable.

In some embodiments, the range bit aspect ratios can be adjusted to accommodate a plurality of zones on a magnetic recording medium, as shown in FIG. 2. For example, one or more zones positioned at the outer edge of the recording medium, at or near the circumference of the medium, can be associated with a target bit aspect ratio of 5 with an areal density capability (ADC) of about 425 gigabits per square inch (GBPSI) for high performance. One or more zones nearer the center of the disk could have a target bit aspect ratio of 3.5 or less with an ADC of about 575 GBPSI. In this configuration, the zones nearer the center of the disk could be substantially optimized for capacity.

Some embodiments are directed to methods of providing varying bit aspect ratios on a magnetic recording medium.

Figure 7:
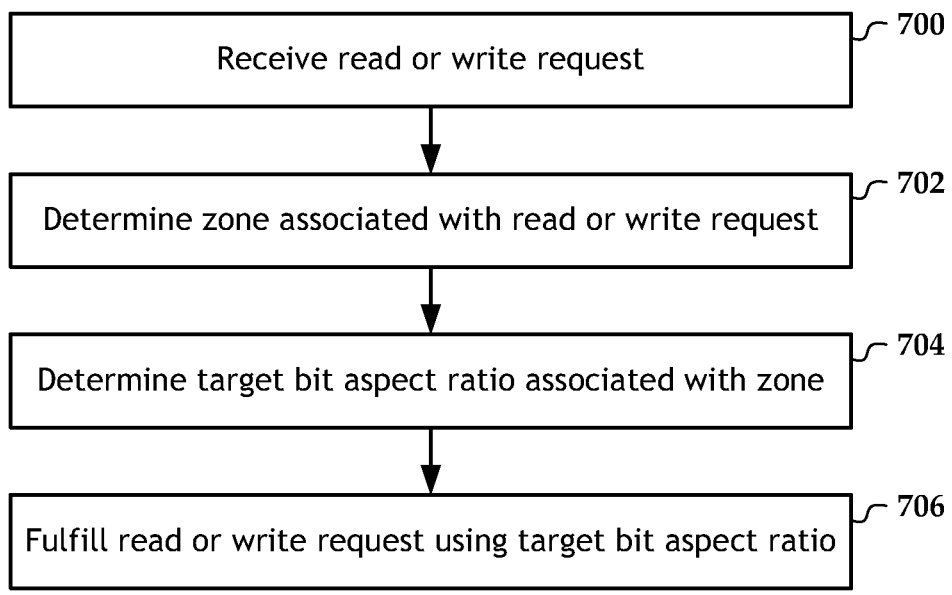
FIG. 7 is a flow chart of a method, in accordance with various embodiments.

FIG. 7 illustrates one example method that is implementable in hardware and/or software by the system shown in FIG. 4. A read or write request is received by a magnetic recording head 700. The request includes various instructions, and includes information about the zone of the magnetic recording medium. The zone associated with the read or write request is determined from the received request 702. The zone can define an area of the magnetic recording medium having a variety of sizes and shapes. For example, a zone can be defined as a pre-determined number of tracks relative to the outer or inner edge of a circular medium, e.g., the 100 kilotracks adjacent the outer circumference of a circular medium. Then a target bit ratio associated with the identified zone is determined 704. The magnetic recording head then fulfills the read or write request by executing the request using the determined target bit aspect ratio 706. Executing the request can include adjusting an operating power of an energy source of the magnetic recording head, as discussed above. If the request is a write request, executing the write request can include adjusting a write channel by one or both of: varying a down-track dimension of bits and varying a cross-track dimension of bits.

Figure 8:
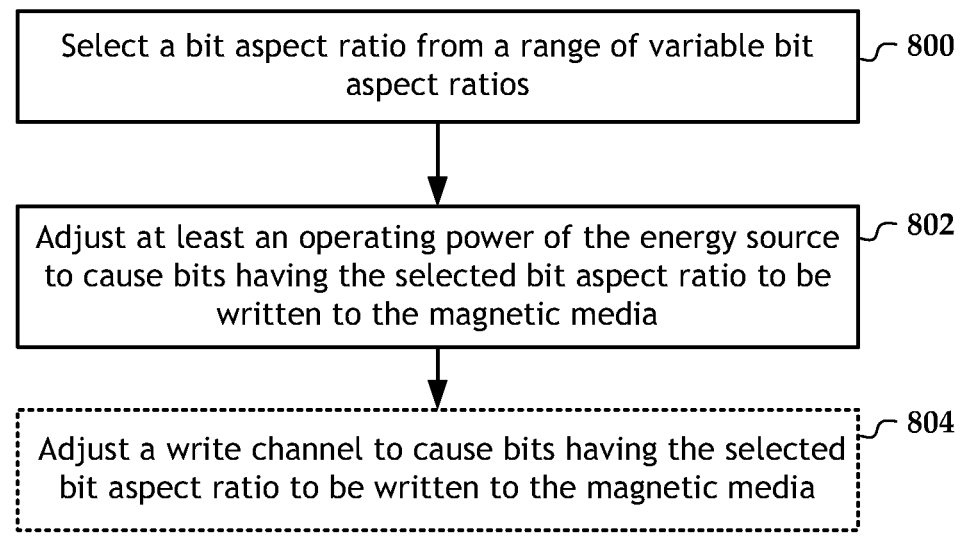
FIG. 8 is a flow chart of a method, in accordance with various embodiments.

Other method embodiments are illustrated in FIG. 8. First, a bit aspect ratio is selected from a range of bit aspect ratios 800. The bit aspect ratio can be automatically selected by the controller of a magnetic recording head or manually entered by an operator. The operating power of an energy source of the magnetic recording head is then adjusted to cause bits having the selected bit aspect ratio to be written to the magnetic recording medium 802. In certain embodiments a write channel is adjusted to cause the bits having the selected bit aspect ratio to be written to the magnetic medium 804. The write channel can be adjusted by adjusting the operating power of the magnetic recording head. For example, increased magnetic recording head power results in wider bits being written—increasing the cross-track dimension of the bits and corresponding write channel. Alternatively, decreased operating power generates narrower cross-track dimensions of written bits.

It is to be understood that even though numerous characteristics of various embodiments have been set forth in the foregoing description, together with details of the structure and function of various embodiments, this detailed description is illustrative only, and changes may be made in detail, especially in matters of structure and arrangements of parts illustrated by the various embodiments to the full extent indicated by the broad general meaning of the terms in which the appended claims are expressed.

What is claimed is:

1. A method, comprising:
   selecting a bit aspect ratio from first and second bit aspect ratios, the first bit aspect ratio designated for performance and the second bit aspect ratio targeted for capacity; and
   adjusting an operating power of an energy source of a magnetic recording head to cause bits having the bit aspect ratio to be written to a magnetic recording medium.

2. The method of claim 1, wherein the magnetic recording medium comprises first and second zones, and wherein the bit aspect ratio is selected based on which of the first and second zones the bits are to be written.

3. The method of claim 2, further comprising:
   receiving a request to read data from the magnetic recording medium;
   determining a zone associated with the request;
   determining a target bit aspect ratio associated with the zone; and
   reading the data using the target bit aspect ratio.

4. The method of claim 3, wherein the data is read via at least two read transducers, each of the at least two read transducers configured to read different ones of the first and second bit aspect ratios.

5. The method of claim 1, wherein first and second bits of the first and second bit aspect ratios have different cross-track dimensions.

6. The method of claim 1, wherein first and second bits of the first and second bit aspect ratios have different down-track dimensions.

7. A method, comprising:
   receiving a request to read data from a recording medium comprising two or more zones each associated with different bit aspect ratios;
   determining a zone associated with the request;
   determining a target bit aspect ratio associated with the zone; and
   reading the data using the target bit aspect ratio.

8. The method of claim 7, wherein a first of the two or more zones is designed for performance based on a first bit aspect ratio and a second of the two or more zones is designed for capacity based on a second bit aspect ratio.

9. The method of claim 7, wherein the data for at least one of the two or more zones is read using multi-level decoding of adjacent tracks.

10. The method of claim 7, wherein the data is read via at least two read transducers, each of the at least two read transducers configured to read different ones of the different bit aspect ratios.

11. The method of claim 7, wherein bits of the different bit aspect ratios have different cross-track dimensions.

12. The method of claim 7, wherein bits of the different bit aspect ratios have different down-track dimensions.

13. The method of claim 7, further comprising writing the data with the different bit aspect ratios to the recording medium, wherein adjusting an operating power of an energy source of a magnetic recording head causes bits having the different bit aspect ratios to be written.

14. The method of claim 7, further comprising writing the data with the different bit aspect ratios to the recording medium, wherein adjusting a write channel causes bits having the different bit aspect ratios to be written.

15. An apparatus, comprising:
   a controller configured to read data from a recording medium via a read transducer, the recording medium comprising two or more zones each associated with different bit aspect ratios, the controller configured to:
   receive a read request;
   determine a zone of the recording medium associated with the read request;
   determining a target bit aspect ratio associated with the zone; and
   read the data via the read transducer using the target bit aspect ratio.

16. The apparatus of claim 15, wherein a first of the two or more zones is designed for performance based on a first bit aspect ratio and a second of the two or more zones is designed for capacity based on a second bit aspect ratio.

17. The apparatus of claim 15, wherein the data for at least one of the two or more zones is read using multi-level decoding of adjacent tracks.

18. The apparatus of claim 15, wherein the read transducer comprises at least two read transducers, each of the at least two read transducers configured to read different ones of the different bit aspect ratios.

19. The apparatus of claim 15, wherein bits of the different bit aspect ratios have different cross-track dimensions.

20. The apparatus of claim 15, wherein bits of the different bit aspect ratios have different down-track dimensions.

* * * * *